United States Patent [19]

Cohen et al.

[11] Patent Number: 5,291,599
[45] Date of Patent: Mar. 1, 1994

[54] DISPATCHER SWITCH FOR A PARTITIONER

[75] Inventors: Edward I. Cohen, Plano, Tex.; Michael R. Sheets, Poughkeepsie, N.Y.

[73] Assignee: International Business Machines Corporation, Armonk, N.Y.

[21] Appl. No.: 742,775

[22] Filed: Aug. 8, 1991

[51] Int. Cl.⁵ ............................................. G06F 15/16
[52] U.S. Cl. .................. 395/700; 364/DIG. 1; 364/281.6; 364/230.1; 364/228.2; 364/245.7; 364/232.1; 395/500
[58] Field of Search .............. 395/700, 275, 200, 500, 395/250, 650

[56] References Cited

U.S. PATENT DOCUMENTS 4,843,541  6/1989  Bean et al.
5,129,088  7/1992  Auslander et al. .................. 395/700

FOREIGN PATENT DOCUMENTS 0210640  7/1986  European Pat. Off.
0301275  7/1988  European Pat. Off.

OTHER PUBLICATIONS

IBM Systems Journal, vol. 28, No. 1, 1989, pp. 104-123, "Multiple Operating III Complex" by T. L. Borden et al.

Michael R. Sheets, "PR/SM in LPAR Mode Performance and Capacity Planning Characteristics," *Computer Measurement Group's CMG'90 Conference Proceedings*, pp. 1-10 (with copies of 19 sheets of view graphs attached).

*Primary Examiner*—Gareth D. Shaw
*Assistant Examiner*—Lucien Toplu
*Attorney, Agent, or Firm*—Bernard M. Goldman

[57] ABSTRACT

A computer partitioner provides services to several partitions coexisting in a computer at one time. To operate efficiently, certain applications executing within a partition will intermittently require specific services to be delivered to them in a timely fashion. This disclosure provides a mechanism for a computer partitioner to provide special time dependent services to partitions on a dynamic demand basis.

2 Claims, 5 Drawing Sheets

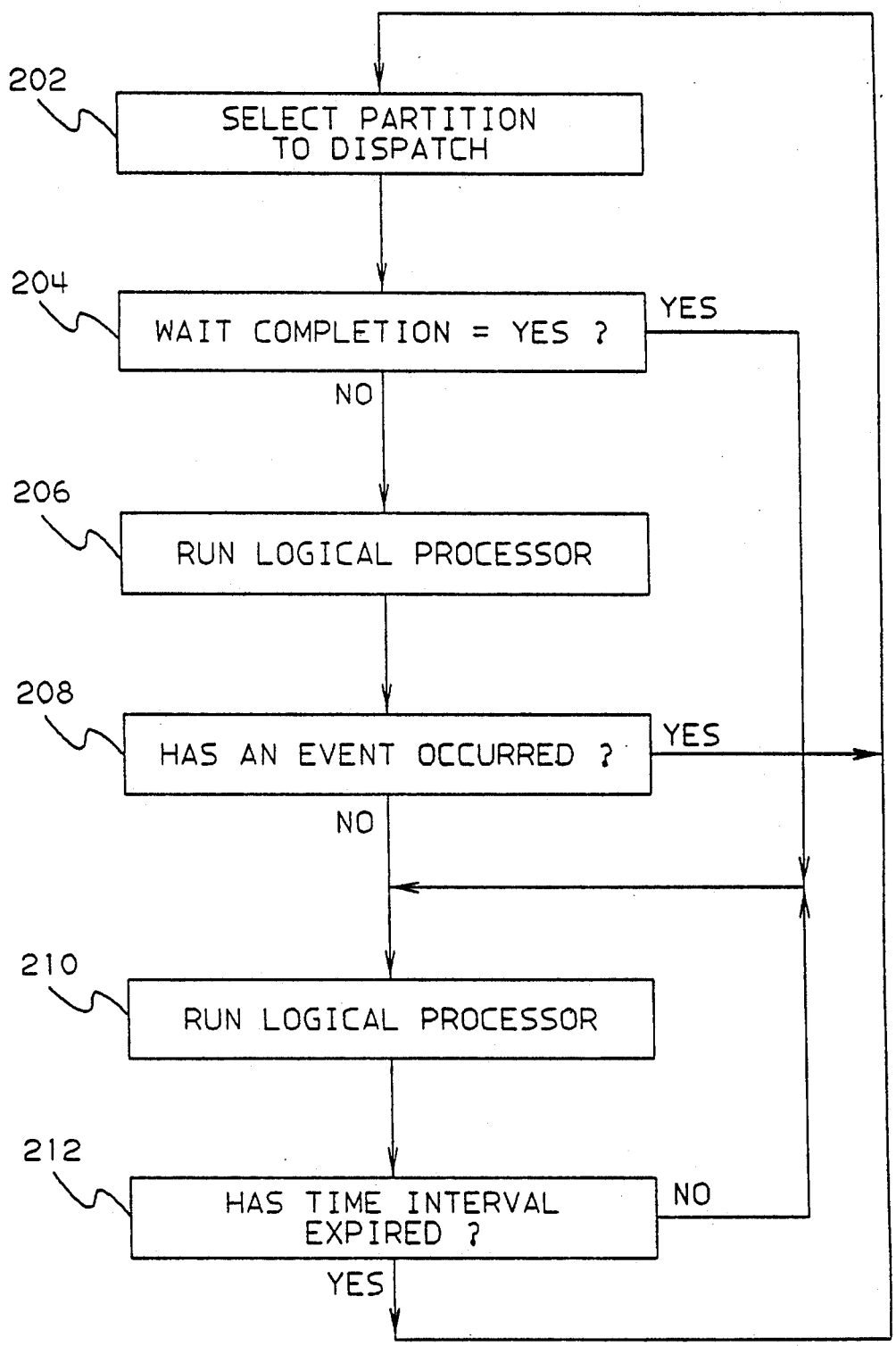

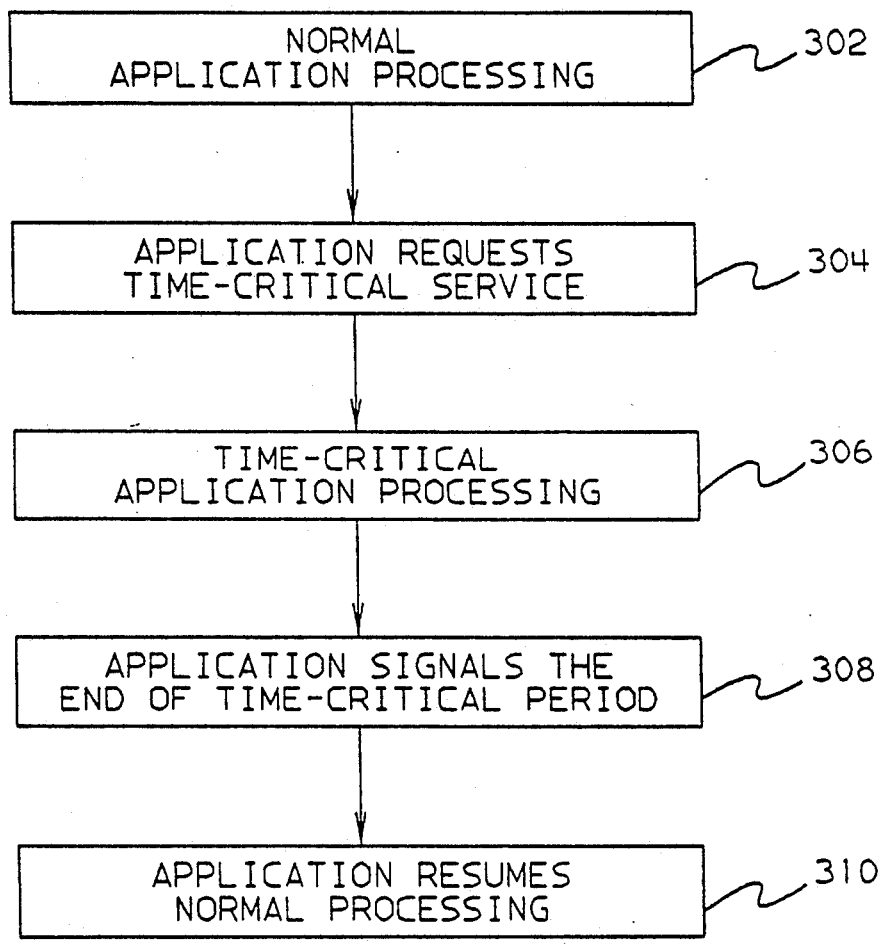

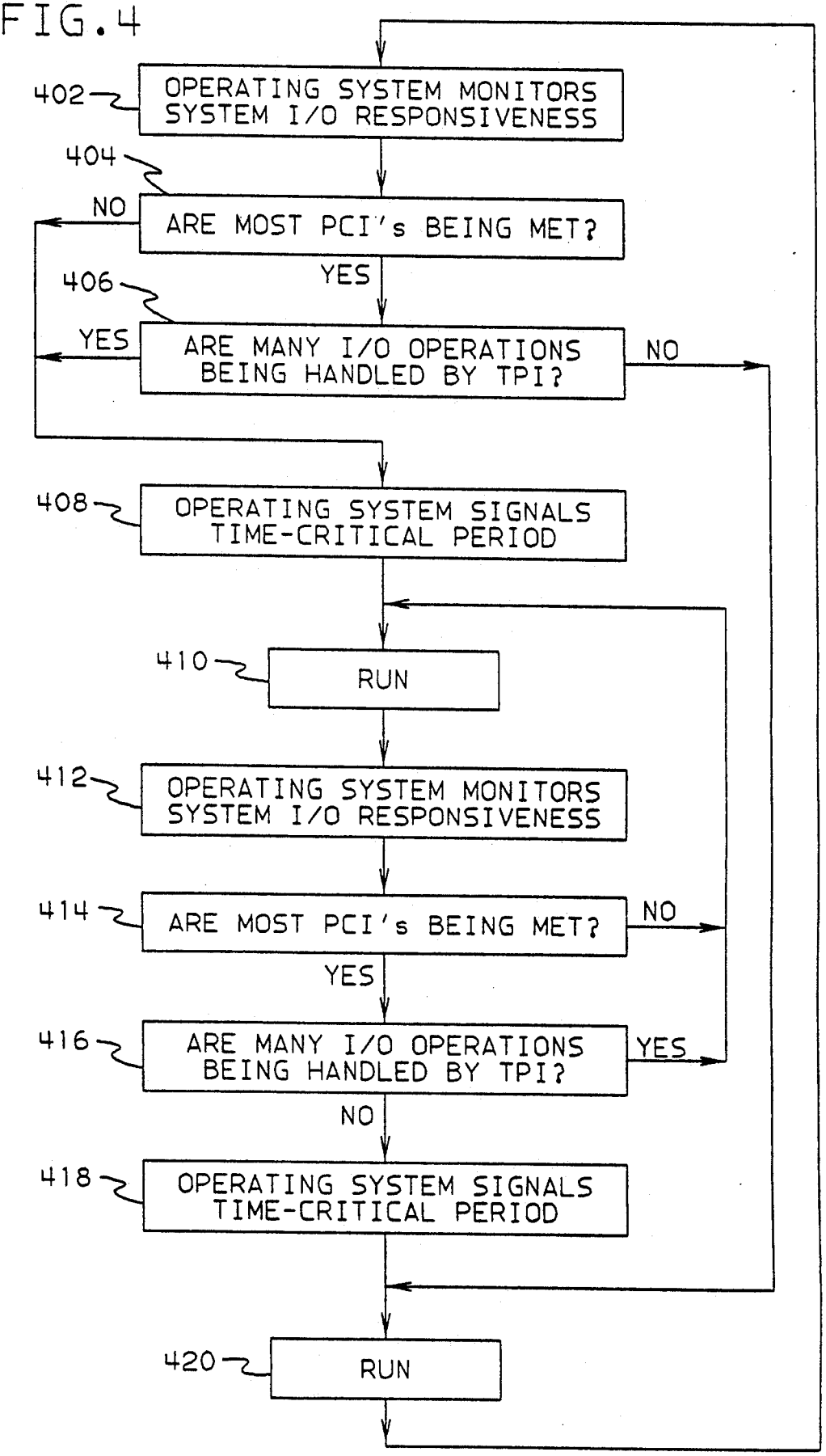

DISPATCHER SWITCH FOR A PARTITIONER

TECHNICAL FIELD

This invention relates to the field of logically partitioned data processing systems. More specifically, the invention relates to a mechanism which allows a computer partitioner to provide special time dependent services to a logical partition on a dynamic demand basis.

BACKGROUND ART

Logical partitioning is a means for logically organizing the resources of a data processing system's processor complex (i.e., a plurality of central processors) such that a plurality of logical (i.e., virtual) processors or partitions result. Logical partitioning allows a user to get the maximum use of a physical resources of a machine by allowing a plurality of partitions to run on the same processor complex simultaneously.

A logical partition is a user-defined set of hardware resources (e.g., processors, memory, channels, etc.) that when combined are sufficient to allow a system control program (i.e., an operating system) to execute. A logical partition can be defined to include:

(1) one or more central processors;
(2) central storage;
(3) one or more channel paths;
(4) optional expanded storage;
(5) one or more optional vector facilities;
(6) sub-channels; and
(7) logical control units.

Logical partitions operate independently, but may share processors and I/O (input/output) devices. The storage for each logical partition is isolated, and cannot be shared by logical partitions. Similarly, channel paths are assigned to logical partitions and may not be shared by two logical partitions at the same time. Each partition is isolated from all other partitions by the partitioner's hardware and micro-code. The only communication available between partitions is via I/O connectivity. Additional background on partitioning is available in T. L. Borden, et al., "Multiple Operating Systems on One Processor Complex," *IBM Systems Journal*, vol. 28, no. 1, 1989, pages 104–123.

Partitions which share processors are known as shared partitions. Partitions which have only dedicated processors are known as dedicated partitions. Since the resources of a dedicated partition are not shared, these partitions do not require workload management. The following discussion relates to workload management between shared partitions, therefore, when "partition" is used, a shared partition is meant.

The Processor Resources Systems Manager (PR/SM) feature available on the IBM (International Business Machines, Inc., Armonk, N.Y.) 3090E and ES/3090S processor families allows logical partitioning (LPAR). PR/SM consists of hardware and micro-code which allow direct partitioning through the system console or indirect partitioning via software control. Additional information on PR/SM is available in *IBM ES/3090 Processor Complex: Processor Resource Systems Manager* (IBM Publication No. GA22-7123).

The partitioner (also known as a hypervisor) is the entity which provides partition access to shared processors. The portion of the partitioner which performs the switching between partitions is known as a partitioner dispatcher. The partitioner dispatcher is similar to the dispatcher of an operating system which time shares a processor between several applications. As used herein, "dispatcher" refers to the partitioner dispatcher rather than an operating system's dispatcher.

The partitioner performs dynamic workload management by allocating the logical processors of each partition to the available physical processors in a way which provides good I/O responsiveness while maximizing the use of physical processors. Dispatching may be done on a strictly time basis (time-driven dispatching), on an event driven basis (event-driven dispatching), or on a combination time and event basis (time/event-driven dispatching).

In time-driven dispatching, the dispatcher will switch the control of a shared processor after a fixed slice or period of time (e.g., 15 milliseconds). The time sharing basis is maintained regardless of the state of the current partition. For example, the current partition will remain active even though it has entered a WAIT state.

In event-driven dispatching, the dispatcher is allowed to time-slice from one partition to the next whenever the current partition no longer needs the shared processor (e.g., when the partition goes into a WAIT state). In time/event-driven dispatching, the dispatcher will switch the control of a shared processor after a fixed slice or period of time, however, an event (e.g., a WAIT state) occurring prior to expiration of the time slice will also trigger the dispatcher to switch control to the next partition. IBM's PR/SM LPAR uses this latter mode of dispatching.

In addition to considering time [(1) below] and events [(2) below], LPAR uses several additional conventional dispatching (scheduling) techniques:

(1) DISPATCH INTERVAL: The dispatcher maintains a maximum time interval for which a logical processor may run for any single dispatch.
(2) EVENT DETECTION: When a partition enters a WAIT state, the dispatcher detects this event and dispatches another partition to run.
(3) PRIORITIES: Each partition has a user defined priority which is taken into account for dispatching.
(4) I/O PREEMPTION: When an I/O interrupt is pending for a logical processor of a partition having a higher priority than the active partition, then the dispatcher will preempt the lower priority partition.
(5) OPERATING SYSTEM INDICATED END: An operating system may determine that its processes are unproductive in the LPAR environment and may voluntarily give up its dispatch interval.

As discussed above, the partitioner seeks to maximizing the use of the physical processors of the processor complex while still maintaining good I/O responsiveness. For example, a processor complex having a single partition would operate at 50% efficiency running an application with a ten millisecond run time followed by ten millisecond WAIT state. In contrast, the same processor complex configured with two partitions, could theoretically have 100% efficiency if two such applications were interleaved.

Note, however, in this example that if the two partition system is run with a dispatch time interval of twenty milliseconds, the partitioned system would still have only 50% efficiency. (Event-driven switching would yield the desired 100% efficiency.) Similarly, dispatching with a time interval of one-half millisecond would avoid the inefficiency caused by the WAIT states, however, the dispatcher overhead would create serious inefficiencies of it own.

Thus, while a partitioner seeks to achieve optimal performance from the processor complex, the dynamic nature of the processor's load will effect the efficiency attained. As can be seen from the above examples, the dispatching mode must be carefully tailored to the specific application. Nonetheless, even with a carefully tailored system, the dispatcher may cause gross inefficiencies for certain applications.

One such application is provided by way of example. A program such as IEBCOPY (an IBM utility program for defragmenting magnetic storage disks) may have I/O operations which are run in parallel with the main program. These I/O operations are handled by a data channel while the main program continues to run on the physical processor. IEBCOPY will initiate the I/O operation by constructing a channel program to run on the data channel. The I/O operation may then execute simultaneously with IEBCOPY.

When the channel program requires additional instructions, it signals the logical processor with a PCI (Program-Controlled Interrupt). If the PCI is handled in a timely fashion, then IEBCOPY can add additional instructions to the channel program, and it will continue to process the I/O. If, however, the PCI is not handled in a timely fashion, then the channel program will run out of instructions and terminate. If there are additional I/O operations to be serviced, IEBCOPY must construct a new channel program and initiate it with a start-channel operation. This start-channel operation involves a large amount of processor overhead as compared with a timely serviced PCI. Accordingly, it is desirable to service the PCI in a timely fashion, especially for an application which has a large number of PCI's.

With known dispatchers, such as LPAR, however, if an application running on the physical processor (e.g., IEBCOPY) enters a WAIT state, then the dispatcher will dispatch the next partition. Now when a PCI is signaled to the logical processor, the dispatcher is involved in deciding whether to service the interrupt by returning control of the physical processor to the logical processor (partition) which requested it. This intervention by the dispatcher creates a delay which often exceeds the critical window available for servicing the PCI. Each missed PCI will then have to be serviced with a start-channel operation. This results in a substantial performance degradation when IEBCOPY is run on a partitioned machine. Another potential performance problem confronted by known dispatchers involves the TPI (Test Pending Interrupt) instruction. TPI is a mechanism for handling a variable sized batch of potentially unrelated I/O interrupts with a single invocation of the "I/O Interrupt Handler" code. When the interrupt handler finishes processing the current I/O interrupt, it issues the TPI instruction which will present the highest priority queued I/O interrupt which needs to be processed next. In this way the batch of I/O interrupts are processed in a very efficient manner. However, if a high percentage of I/O interrupts are being processed via TPI, it means that I/O's are being delayed which can disrupt the overall processing of the partition's workload. In this case the partitioner should consider improving the partition's ability to use the physical processor.

PR/SM LPAR has an option called WAIT COMPLETION which provides a partial solution to these problems. The WAIT COMPLETION option allows a user to change the dispatching technique. That is, if WAIT COMPLETION=YES is specified, then the dispatcher will not perform event detection. The result is that the dispatcher effectively becomes a strictly time-driven dispatcher.

The WAIT COMPLETION=YES option can be used to provide the time-critical processing required by applications such as IEBCOPY. When this option is specified, the dispatcher will be strictly time-driven such that when IEBCOPY enters a WAIT state, it will be ignored so that the physical processor will be available for the entire dispatch interval to service PCI's.

The WAIT COMPLETION=YES option, however, has several disadvantages. First, it requires operator intervention to be selected. Second, it operates for all partitions running on the processor complex such that the performance of other partitions which do not require time-critical processing will be reduced.

What is needed is a means to provide time-critical processing to a particular partition on a dynamic demand basis.

DISCLOSURE OF THE INVENTION

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 2 is a flow chart showing the operational steps involved in conventional time/event-driven dispatching.

FIG. 3 is a flow chart showing the operational steps involved for an application to signal a partitioner of a request for time-critical processing.

FIG. 4 is a flow chart showing the operational steps involved for an operating system to signal a partitioner of a request for time-critical processing.

FIG. 5 depicts a sample count table for the partitioned data processing system of FIG. 1.

BEST MODE FOR CARRYING OUT THE INVENTION

The present invention is now described with reference to the drawings. In the preferred embodiment the invention is implemented on an IBM 370/390 processor complex equipped with a PR/SM partitioner. The partition requesting critical processing is running IBM's MVS (Multiple Virtual Storage) operating system.

Figure 1:
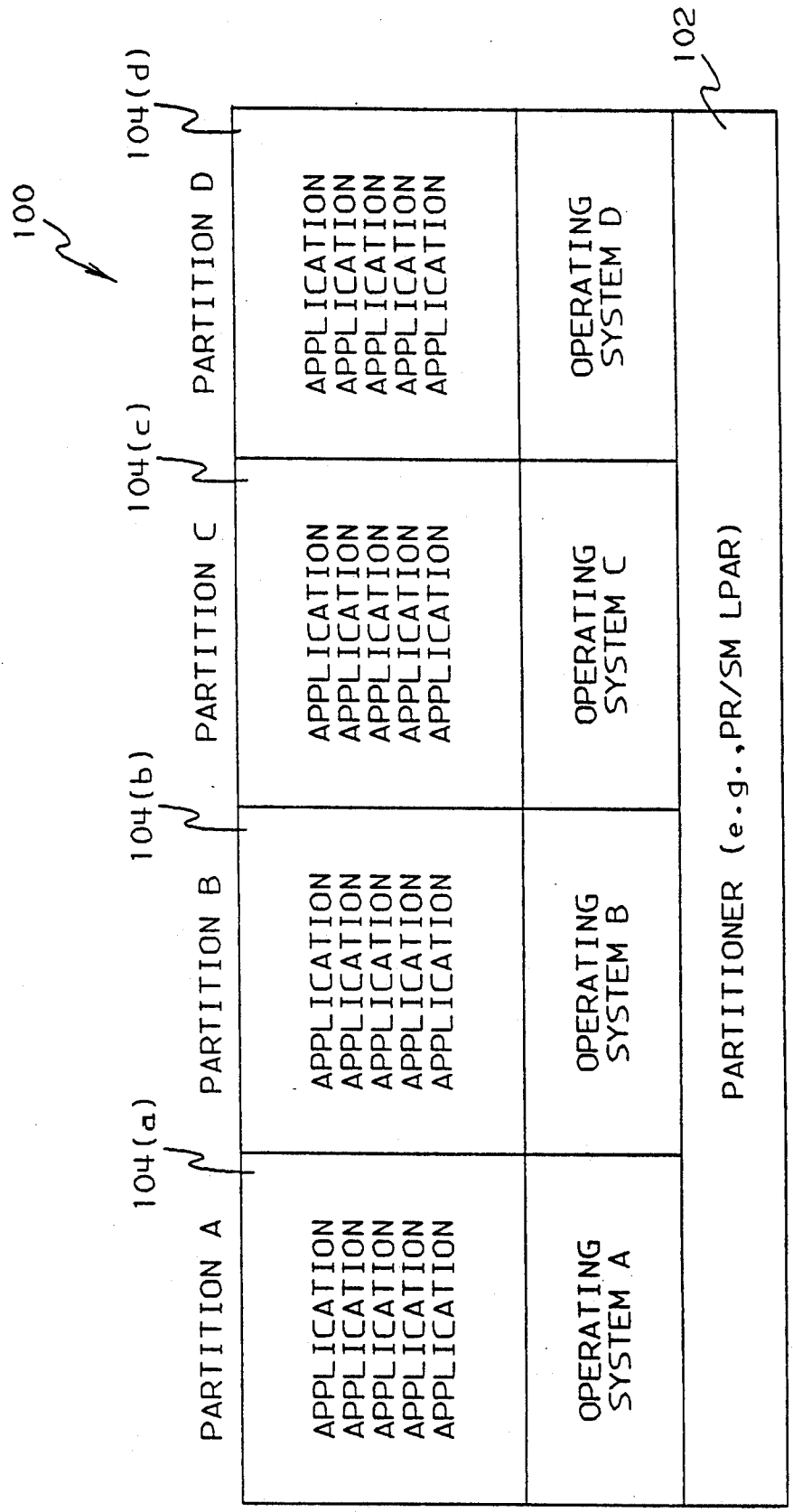
FIG. 1 is a block diagram representing a partitioned data processing system 100.

FIG. 1 is a block diagram of a partitioned system 100. A partitioner 102 has logically divided system 100 into four partitions 104(a)-104(d). Note that each partition has its own operating system and applications running thereon.

Conventional dispatching is now described with reference to FIG. 2. The dispatcher (e.g., LPAR) of a known partitioner utilizes time/event-driven dispatching as discussed above. At step 202, a partition is selected. At step 204, the WAIT COMPLETION flag is checked. If WAIT COMPLETION=NO, then the partition is allowed to run normally at step 206. If WAIT COMPLETION=YES, then the method proceeds to step 210 where the partition is run on a time-driven basis regardless of WAIT states.

After step 206, the dispatcher checks for the occurrence of an event (such as a WAIT state) at step 208. If an event (e.g., a WAIT state) has not occurred, then the partition runs at step 210. If, however, an event has occurred, the dispatcher returns to step 202 where a new partition is selected. Following step 210, the run time is checked at step 212. If the allotted interval (i.e., time slice) has elapsed, then the next partition is dispatched at step 202.

This conventional dispatcher will provide either time-driven or event/time-driven switching for all partitions. For many applications, a sufficient response time and workload balancing will result. However, WAIT COMPLETION=YES requires operator intervention to be set, can only be set from the system console, and once set, WAIT COMPLETION will be enable for all partitions only.

Certain applications might want the dispatcher to dynamically switch from event/time-driven to time-driven dispatching and back for a particular application only. Known dispatchers cannot provide this service.

The invention provides a dynamic time-driven switch which allows a single partition to switch from event-/time-driven dispatching to time-driven dispatching and back on a demand basis. Time-driven dispatching is also referred to as time-critical processing or simply critical processing. The time-driven switch of the present invention may be controlled by the application being executed or by a partition's operating system. The invention is described with reference to the FIGS. 3-6.

1. Time-Driven Switch Controlled by Application

The method for providing dynamic switching on demand by an application running on a partition is described with reference to FIG. 3. An application is processing normally at step 302. At step 304, the application begins time-critical processing and desires time-driven service. The application signals the partitioner of the start of the critical processing. The partitioner then sets the dynamic time-driven switch to ON (SWITCH-=ON).

At step 306, the time-critical portion of the application is processed. At step 308, the application reaches the end of its time-critical processing and signals this to the partitioner. The partitioner then sets the dynamic time-driven switch to OFF (SWITCH=OFF), and the application resumes normal processing at step 310.

2. Time-Driven Switch Controlled by Operating System

The method for providing dynamic switching on signaling by a partition's operating system is described with reference to FIG. 4. The operating system monitors the responsiveness of the partition to an application's I/O requests at step 402. At steps 404 and 406, the operating system determines if most PCI's are being met, and whether many I/O operations are being handled by the test pending interruption (TPI) instruction. If most program-controlled interrupts (PCI's) are not being met, or if many I/O operations are being handled by the test pending interruption (TPI) instruction, then the operating system signals the partitioner of the start of critical processing at step 408. In response, the dispatcher may set the dynamic time-driven switch to ON (SWITCH=ON). The application continues to run (e.g., for a predetermined interval) at step 410.

At step 412, the operating system re-checks the I/O responsiveness. If most program-controlled interrupts (PCI's) are not being met (step 414), or if many I/O operations are being handled by the test pending interruption (TPI) instruction (step 416), then the operating system maintains its request for critical processing and returns to step 410. If most program-controlled interrupts (PCI's) are being met and few I/O operations are being handled by the test pending interruption (TPI) instruction, then the operating system signals the end of the time critical period and the dynamic time-driven switch is set to OFF (SWITCH=OFF) at step 418. The application then continues to run at step 420 with normal time/event-driven dispatching.

If, at steps 404 and 406, most program-controlled interrupts (PCI's) are being met and relatively few I/O operations are being handled by the test pending interruption (TPI) instruction, then the operating system proceeds directly to step 420 where the application continues to run (e.g. for a predetermined interval) before returning to step 402 where the procedure repeats.

In general, it is preferable to have the partition's operating system determine if critical processing should be enabled. This is because most applications are not aware of the partition's total utilization. Partition utilization is an important consideration. For example, with IEB-COPY discussed above, a heavily loaded partition would miss few PCI's because few WAIT states would be entered by the partition. If IEBCOPY were allowed to enable critical processing without regard to total partition utilization, no advantage would be attained and performance might actually be degraded by reducing the event driven nature of the dispatcher. An additional disadvantage of application signaling would be that each application might have to be modified to allow signalling of a request for critical processing.

3. Partitioner Handling of Special Processing Request

Whether the application or the operating system signals the dispatcher that critical processing (i.e., SWITCH=ON) is desired, the communication between the software and the partitioner could be handled via the DIAGNOSE interface. The conventional DIAGNOSE interface allows communication between partitions and the partitioner in a number of different ways. For example, the partition could use either a predetermined memory location or a predetermined I/O address that both it and the partitioner had access to. In either of these cases, the protocol would need to be agreed to and adhered to by all partition operating systems and all versions of the partitioner. Another approach would be to define a new instruction for communicating between partitions and partitioners. This instruction would have to be defined as needing hypervisor intervention so that the partitioner would get control whenever the instruction was executed. The most direct and preferred approach would be to use the conventional DIAGNOSE interface which allows communication between the partition and the partitioner via the DIAGNOSE instruction. DIAGNOSE is a very powerful facility with many uses which are selected via numeric code, (e.g., a DIAGNOSE 22 is a different function from a DIAGNOSE 44). Two new codes could be assigned to this function, one for turning the time-critical switch on and the other for turning it off.

It may be desirable to limit the ability to enable critical processing to certain applications only. Similarly, more than one application running on a partition may request critical processing. An authorization scheme may be implemented to control which applications are authorized to enable critical processing. In MVS this could be implemented via the use of the DIAGNOSE instruction. The DIAGNOSE instruction is a privileged instruction which is restricted to authorized applications only. Thus, this authorization scheme can be adapted to limit which application may request critical processing.

The partitioner keeps track of critical processing requests from each partition and maintains a record of which partitions are authorized to request special processing in a count table. A sample count table 500 is shown in FIG. 5 for partitioned system 100 of FIG. 1. Note that a switch count of greater than one means that more than one application in the partition has requested critical processing. The partitioner increments the partition switch count for each request for critical processing (SWITCH=ON), and decrements the switch count for each request for normal processing (i.e., SWITCH=OFF). As is shown, count table 500 may also be used to store authorization data for each partition. As discussed above, this allows critical processing to be requested by certain partitions only.

Figure 6:
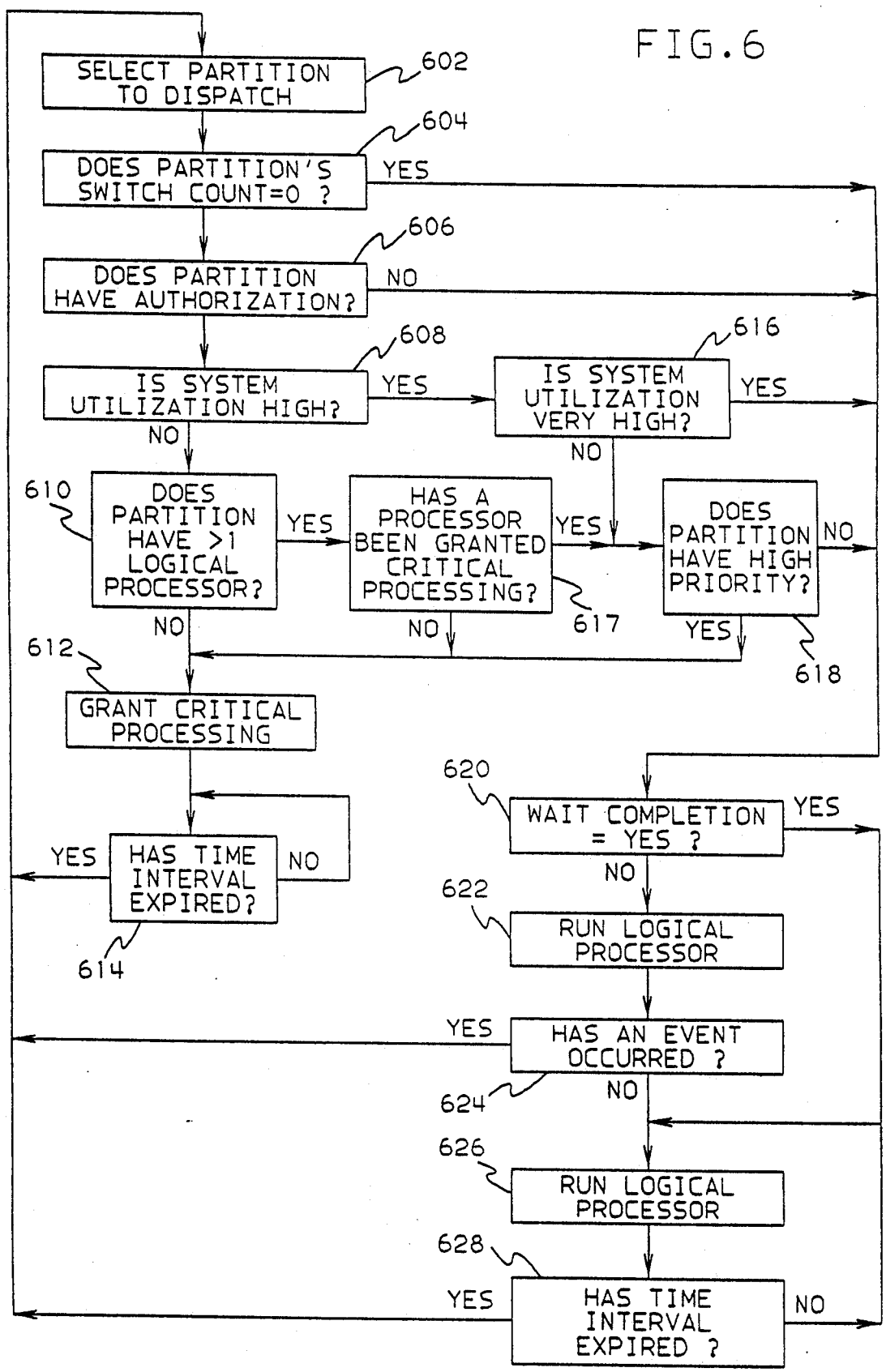
FIG. 6 is a flow chart of the partitioner decision process in determining whether to grant time-critical processing to a requesting partition.

The partitioner dispatcher is now described with reference to FIG. 6. A partition is selected and dispatched at step 602. At step 604, the switch count for the selected partition is checked. If the switch count is equal to zero (i.e., no logical processor in the partition has request critical processing), then the dispatcher proceeds to step 620 for normal dispatching. If the switch count is not equal to zero (i.e., there is an outstanding request signal), then the partition's authorization is checked in the count table at step 606. If the partition does not have authorization to signal the partitioner for a SWITCH=ON, then the dispatcher proceeds to step 620 for normal dispatching. If the partition does have authorization, then the system utilization is checked at step 608. If the system utilization is high, then the dispatcher advances to step 616. If the system utilization is not high, then step 610 is executed.

At step 610, the partition is checked. If the partition has only one logical processor, then critical processing is granted at step 612 and WAIT states are ignored. If the partition has more than one logical processor, then the dispatcher advances to step 617. After critical processing is granted at step 612, the logical processor will execute until its time interval expires at step 614. Upon expiration of the time interval, the dispatcher returns to step 602 where the process is repeated for the next dispatched partition.

At step 616, system utilization is re-checked. If utilization is very high (i.e., the system is very busy), then the dispatcher proceeds to step 620 for normal dispatching. If not, the process advances to step 618. At step 617, it is determined whether a logical processor within the partition has already been granted critical processing. If so, then the process advances to step 618. If not, then critical processing is granted at step 612. At step 618 the priority of the partition is checked. If it is a high priority partition, then critical processing is granted at step 612. Otherwise, normal dispatching continues at step 620.

At step 620, the WAIT COMPLETION flag is checked. If WAIT COMPLETION=NO, then the partitioner allows the logical processor to run normally at step 622. If WAIT COMPLETION=YES, then the dispatch executes step 626 where the partition is dispatched on a time-driven basis and the logical processor is allowed to run regardless of WAIT states.

At step 624, the partitioner checks for the occurrence of events (such as a WAIT state) upon which the next partition is to be dispatched. If an event (e.g., a WAIT state) has not occurred, the logical processor continues to run at step 626. If, however, an event has occurred, the method returns to step 602 where the next partition is dispatched. At step 628, the run time is checked. If the allotted time interval has elapsed, then the method returns to step 602 where the next partition is dispatched.

While the invention has been particularly shown and described with reference to a preferred embodiment thereof, it will be understood by those skilled in the art that various changes in form and details may be made therein without departing from the spirit and scope of the invention.

What is claimed is:

1. A method executed by a programmed data processing system for allowing a requesting partition, comprised of programs of instructions, of a logically partitioned data processing system, having its physical resources partitioned among a plurality of partitions by a partitioner, to change dispatch modes on a dynamic demand basis, said method comprising the steps of:
    (a) signalling to the partitioner by the requesting partition, in response to a program instruction, a request to change the dispatch mode by the partitioner to perform critical processing by the requesting partition;
    (b) incrementing a switch count value associated with each partition each time the associated partition executes said instruction requesting a change in the dispatch mode,
    (c) examining by the partitioner of current switch count values
    (d) changing or not the dispatch mode of said partitioner for said partition in response to said request for a change in dispatching in response to a non-zero value of the switch count value for a requesting partition.

2. A method executed by a programmed data processing system for allowing a requesting partition, comprised of programs of instructions, of a logically partitioned data processing system, having its physical resources partitioned among a plurality of partitions by a partitioner, to change dispatch modes on a dynamic demand basis, said method comprising the steps of:
    (a) signalling to the partitioner by the requesting partition, in response to a program instruction, a request to change the dispatch mode by the partitioner to perform critical processing by the requesting partition;
    (b) examining by the partitioner of current system parameters including a priority rating for each of plural partitions in said data processing system, said step including determining the relative priority of two or more partitions requesting a change to the dispatch mode,
    (c) changing the dispatch mode of said partitioner for a partition in response to said request for a change in dispatching only if it is the highest priority of two or more partitions requesting a change in the dispatch mode.

* * * * *